United States Patent
Paborn et al.

[11] Patent Number: 6,002,824
[45] Date of Patent: Dec. 14, 1999

[54] FIBER OPTIC CABLE WITHOUT REINFORCING MEMBERS

[75] Inventors: Jorgen Paborn, Sexdrega, Sweden; Peter Elisson, Courbevoie, France

[73] Assignee: Alcatel, Paris, France

[21] Appl. No.: 09/131,407

[22] Filed: Aug. 10, 1998

Related U.S. Application Data

[63] Continuation of application No. 08/797,736, Feb. 11, 1997, Pat. No. 5,862,284.

[30] Foreign Application Priority Data

Feb. 13, 1996 [FR] France ................................. 96 01743

[51] Int. Cl.⁶ .................................................. G02B 6/44
[52] U.S. Cl. ................................. 385/106; 385/4.5
[58] Field of Search ........................... 385/100–114, 115, 385/116, 121

[56] References Cited

U.S. PATENT DOCUMENTS

| | | | |
|---|---|---|---|
| 3,758,188 | 9/1973 | Koester | 385/115 |
| 4,011,077 | 3/1977 | Phaneuf et al. | 85/116 |
| 4,666,244 | 5/1987 | Van Der Velde et al. | 350/96.23 |
| 4,693,551 | 9/1987 | Blanco et al. | 350/96.23 |
| 4,930,860 | 6/1990 | Tansey et al. | 350/96.23 |
| 5,430,816 | 7/1995 | Furuya et al. | 385/33 |

FOREIGN PATENT DOCUMENTS

| | | |
|---|---|---|
| 0495241A2 | 7/1992 | European Pat. Off. |
| 4040715A1 | 6/1992 | Germany . |
| 2258319 | 2/1993 | United Kingdom . |
| WO9201962 | 2/1992 | WIPO . |

*Primary Examiner*—Hung N. Ngo
*Attorney, Agent, or Firm*—Sughrue, Mion, Zinn Macpeak & Seas, PLLC

[57] ABSTRACT

A fiber optic cable comprises a plurality of packages each made up of a plurality of optical fiber ribbons. The packages are arranged in a tight structure incorporated in a polymer resin so that the packages themselves constitute reinforcements that impart strength to the cable and prevent curvature of the optical fibers due to variations in temperature. This eliminates the need to incorporate any central and/or peripheral reinforcing member into the cable.

1 Claim, 1 Drawing Sheet

FIBER OPTIC CABLE WITHOUT REINFORCING MEMBERS

This is a continuation of Application No. 08/797,736 filed Feb. 11, 1997, the disclosure of which is incorporated herein by reference, now U.S. Pat. No. 5,862,284.

BACKGROUND OF THE INVENTION

1. Field of the Invention

The present invention concerns fiber optic data transmission cables and in particular a fiber optic cable containing no reinforcing members.

2. Description of the Prior Art

Fiber optic cables are increasingly being used in data transmission, either as overhead cables or as buried cables. Regardless of the application, one essential component of a fiber optic cable is a central/or peripheral reinforcing member one function of which is to withstand tension loads applied to the cable during its installation. One such cable is described in U.S. Pat. No. 4,693,551.

Another essential function of the central and/or peripheral reinforcing member is to prevent curvature of the optical fibers due to temperature variations and likely to lead to loss of quality in data transmission. The optical fibers have a low coefficient of thermal expansion and their length therefore varies only slightly as the temperature falls (or rises), whereas the length of the plastics material surrounding them tends to vary by a large amount in this situation, because of its higher coefficient of thermal expansion. It is for this reason that in fiber optic cables the reinforcing member such as that shown in the patent mentioned hereinabove, which has a coefficient of thermal expansion approximately equal to that of the optical fibers, serves to limit variations in the length of the cable in the event of variations in temperature. A reinforcing member of this kind is generally made of metal or of a plastics material reinforced with glass fibers in the case of dielectric cables.

Moreover, when a reinforcing member is present, and still with the aim of preventing inappropriate curvature of the optical fibers, the latter are generally loose in their sheath, as shown in the U.S. Pat. No. previously mentioned. This loose structure allows the sheath to expand or contract freely without stressing the optical fibers and thus causing them to become curved.

In addition to a central reinforcing member, the use of a sheath of aramide fibers (sold under the trademark "Kevlar") at the periphery of the cable is known in itself. In the extreme situation, given that the optical fibers are mounted loose in the cable as previously explained, and provided that a large quantity of aramide fibers is used, it would be possible to dispense with any rigid central reinforcing member.

Unfortunately, the use of reinforcing members is costly, particularly in the case of dielectric cables when the reinforcing member is of a plastics material reinforced with glass fibers and/or in the case of aramide fiber sheaths, and this considerably increases the manufacturing cost of the fiber optic cable.

For this reasons, the aim of the invention is to provide a fiber optic cable that does not contain any central and/or peripheral reinforcing member made of metal or of a plastics material reinforced with glass fibers.

SUMMARY OF THE INVENTION

The invention consists in a fiber optic cable comprising at least one package made up of a plurality of optical fiber ribbons and reinforcing means adapted to impart strength to the cable and to prevent curvature of its optical fibers due to variations in temperature, wherein said at least one package of optical fiber ribbons has a square structure incorporated in a polymer resin so that of itself it constitutes the reinforcing means.

Another feature of the invention is to dispose a plurality of packages in the cable, preferably a number of packages which is a square number, for example four packages, so that each of the packages constitutes a reinforcing member vis a vis the other packages.

The aims, objects and features of the invention will emerge more clearly from a reading of the following description given with reference to the accompanying drawings.

DETAILED DESCRIPTION OF THE PREFERRED EMBODIMENTS

Figure 1:
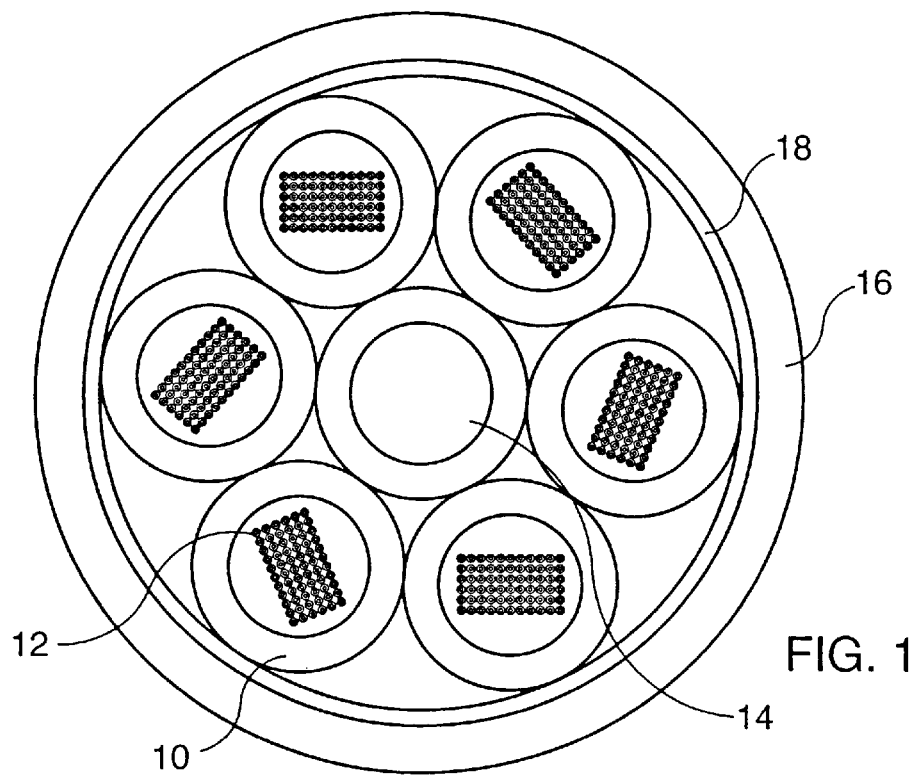
FIG. 1 shows a fiber optic cable comprising a plurality of packages of optical fiber ribbons and a reinforcing member as used in the prior art.

As shown in FIG. 1, a prior art fiber optic cable comprises a plurality of plastics material tubes 10, six tubes in this example, in each of which disposed a package 12 of optical fiber ribbons. Each ribbon generally comprises twelve optical fibers and a package comprises six ribbons. As can be seen, each package has dimensions less than the diameter of the tube, resulting in a loose structure so that they are not stressed by the plastics material tube in the event of variations in temperature.

The tubes 10 containing the packages of optical fibers are disposed around a reinforcing member having a core 14 of plastics material reinforced with glass fibers. The cable has a plastics material outer sheath 16 separated from the tubes 10 containing the packages of optical fibers by an aramide fiber jacket 18, the interstices between the tubes and the jacket being filled with a filler material. The function of the reinforcing member 14 is to impart the required strength to the cable and to attenuate contraction or elongation of the cable due to variations in temperature. This latter function is also assured by the aramide fiber jacket 18.

Figure 2:
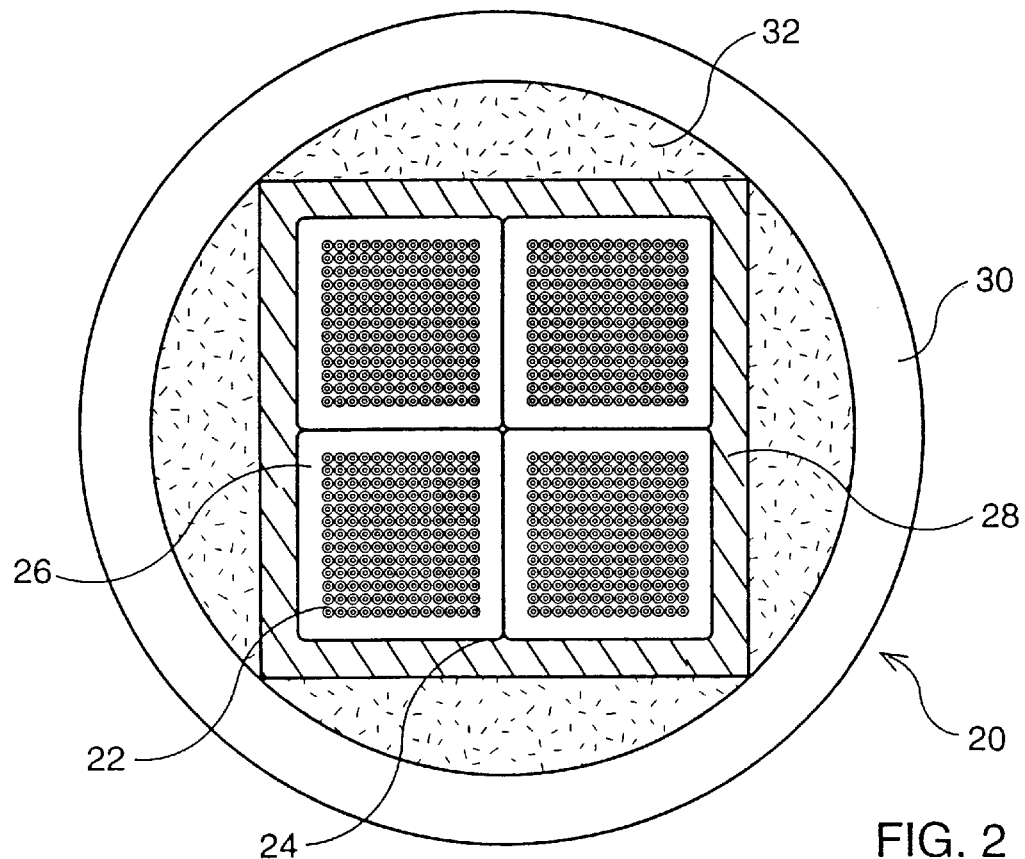
FIG. 2 shows a preferred embodiment of a fiber optic cable in accordance with the invention comprising four packages of optical fiber ribbons.

Unlike a prior art fiber optic cable, the fiber optic cable 20 of the invention shown in FIG. 2 does not include any reinforcing members.

The cable 20 comprises four packages 22 of optical fibers, each package being formed by stacking nine ribbons each of twelve optical fibers, so that its shape is approximately square. Note that any other package shape is possible, but the square shape is preferable.

As shown in FIG. 2, each package 22 is incorporated into a unit 24 of approximately square shape in which the package 22 is surrounded by a layer 26 of polymer resin, for example a thermoplastics resin.

In the cable 20 shown in FIG. 2, four units of optical fiber packages are placed side by side in an approximately square arrangement. However, the cable may contain any number of groups such as one, two, three, etc groups, a square number of packages (for example four or nine packages) being preferable.

The combination of the four units of packages is surrounded by an approximately square aramide fiber jacket 28.

The combination is disposed in a plastics material outer sheath 30, the interstices between the aramide fiber jacket and the outer sheath being filled with a low-cost filler material 32 having a low coefficient of thermal expansion, for example glass fibers or any other material having an equivalent coefficient of expansion.

The method of manufacturing the cable 20 is relatively simple. The packages are formed first by stacking optical fiber ribbons. Each unit is then formed by extruding a polymer resin around each package of optical fibers.

The cable shown in FIG. 2 is then constituted from four units formed as described hereinabove. Although it is not mandatory, it is preferable to twist the four units obtained by extrusion in a particular spiral direction. The aramide fiber jacket formed around the four units of packages of optical fibers is also twisted, but in the opposite spiral direction to the spiral direction chosen for twisting the units, so as to compensate the torque introduced by twisting the optical fiber units. The glass fiber filler material is twisted in the same direction as the units of packages. The final step is to extrude the outer sheath. Note that this latter operation may be carried out in tandem with the preceding operations.

The fiber optic cable 20 as described hereinabove is as strong as a cable incorporating a reinforcing member. However, its essential characteristic is its resistance to tension or compression forces due to variations in temperature, which is procured by the tight structure of the optical fiber packages and which prevents any micro-curvature or macro-curvature of the optical fibers that could lead to loss of quality in the transmission of data.

The aramide fiber jacket 28 that constitutes a costly component of the cable can be thin, its required thickness being inversely proportional to the degree to which the tensile strength of the cable is increased by the optical fiber package units. A tight structure of four square units as shown in FIG. 2 makes the cable stronger than a structure with a single unit, and therefore requires a thinner layer of aramide fibers for jacket 28.

Finally, one advantage of the cable of invention is that, for the same number of optical fibers, its diameter is less than that of a prior art cable because the structure is tight, rather than loose as in the prior art cable. Generally speaking, a loose structure optical fiber cable with a reinforcing member as currently commercially available contains 600 optical fibers and has an outside diameter of 40 mm, representing a fiber density of $1.6/mm^2$. A cable of the invention comprising 600 optical fibers would have an outside diameter of approximately 22 mm and thus a fiber density of $5/mm^2$.

There is claimed:

1. A fiber optic cable comprising at least one package made up of a plurality of optical fiber ribbons and reinforcing means adapted to impart strength to said cable and to prevent curvature of its optical fibers due to variations in temperature, wherein said at least one package of optical fiber ribbons constitutes a square structure incorporated in a polymer resin layer so that said at least one package is used as a tensile strength member for installation by traction and constitutes said reinforcing means.

* * * * *